United States Patent [19]
Bier

[11] Patent Number: 4,638,174
[45] Date of Patent: Jan. 20, 1987

[54] SWITCHING DEVICE FOR LIGHTING THE INTERIOR OF A MOTOR VEHICLE

[75] Inventor: Axel Bier, Gundelsheim, Fed. Rep. of Germany

[73] Assignee: Audi NSU Auto Union Aktiengesellschaft, Fed. Rep. of Germany

[21] Appl. No.: 685,453

[22] PCT Filed: Mar. 14, 1984

[86] PCT No.: PCT/DE84/00057
§ 371 Date: Feb. 25, 1985
§ 102(e) Date: Feb. 25, 1985

[87] PCT Pub. No.: WO84/03670
PCT Pub. Date: Sep. 27, 1984

[30] Foreign Application Priority Data
Mar. 17, 1983 [DE] Fed. Rep. of Germany ....... 3309548

[51] Int. Cl.$^4$ .............................................. B60Q 3/02
[52] U.S. Cl. .............................. 307/10 LS; 307/141.4; 315/84
[58] Field of Search ................. 307/10 LS, 10 R, 141, 307/141.4; 315/84, 360

[56] References Cited
U.S. PATENT DOCUMENTS
4,071,805  1/1978  Brock .............................. 315/360 X
4,122,371  10/1978  Talmage et al. ..................... 315/84
4,123,668  10/1978  Decota ............................ 307/10 LS FOREIGN PATENT DOCUMENTS
2854729  7/1980  Fed. Rep. of Germany.

Primary Examiner—Philip H. Leung
Assistant Examiner—T. DeBoer
Attorney, Agent, or Firm—Kane, Dalsimer, Kane, Sullivan and Kurucz

[57] ABSTRACT

In a switching device for the interior lighting L of a motor vehicle, having a timing element R1 C1 which is controlled by a gate contact switch TK which is opened by closing a vehicle door and which sets on the interior lighting during a certain time lapse after closing the door, a second timing element R2 C2 is provided to be controlled by the closing of the gate contact switch TK and to set off the interior lighting L after a predetermined time interval, when the ignition switch ZS is open. Thereby, the discharge of the vehicle battery is prevented due to the interior lighting L when a door remains inadvertently open, but, when the ignition is turned on, the interior lighting L remains on if a door is open.

3 Claims, 1 Drawing Figure

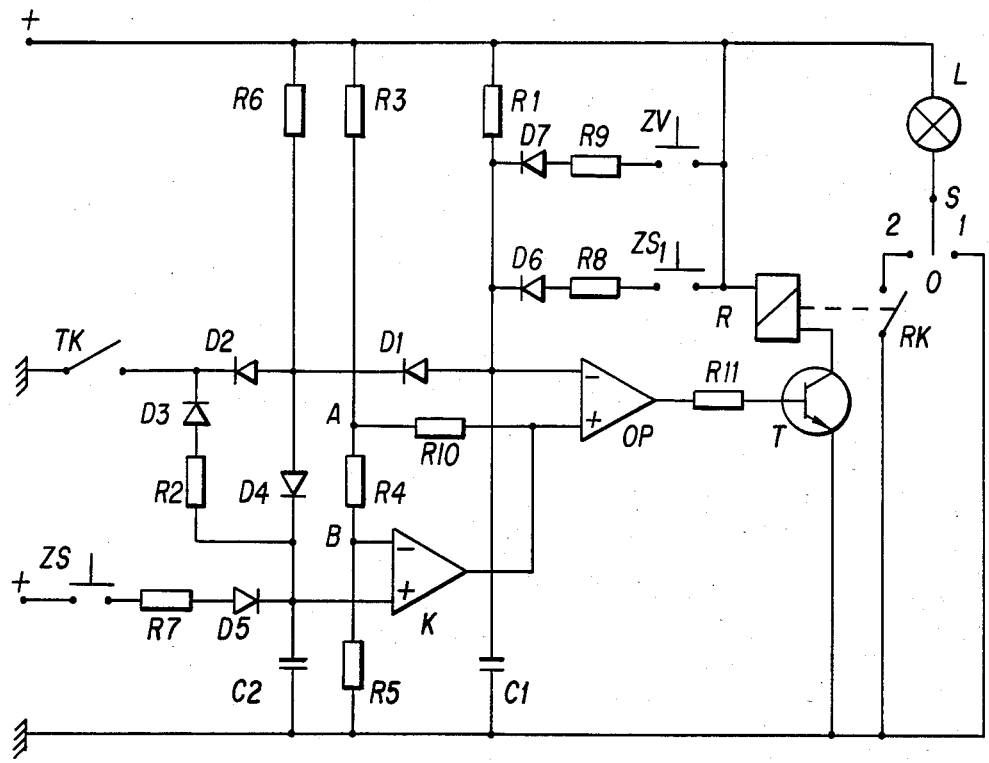

SWITCHING DEVICE FOR LIGHTING THE INTERIOR OF A MOTOR VEHICLE

The invention relates to a switching device for lighting the interior of a motor vehicle having an ignition switch.

Such circuits have the advantage that the seat belts can be put on and the key inserted in the ignition lock or the driver's door locked from the outside while the interior lights are switched on. It is however a disadvantage that the battery of the vehicle may become discharged if a door of the vehicle is inadvertently left open over a longer period of time and for this reason the interior lights remain switched on by the door contact switch, which in this case is in the closed position.

It is an object of the invention to provide a switching device, with which discharging of the vehicle battery, when the door is left open for long periods, is prevented.

This objective is accomplished by the distinguishing features described below.

When the door is open (that is, when the door contacts are in the closed position), the inventively provided second timing element switches off the interior lighting after several minutes, however only if the ignition switch is open and the engine thus is not running, since it is normally not possible to discharge a battery when the engine is running and it would be unacceptable that, when the is engine running and the vehicle thus normally is occupied, the interior lights go out when a vehicle door is open for some time.

Preferably, the second timing element remains set through closing the ignition switch is closed, so that, after the door is closed and the ignition switched on, the interior lighting remains switched on even when a vehicle door stays open for some time.

With a conventional delay circuit, the interior lighting, after the door is closed, remains switched on through a transistor, whose base is connected with the output of an operational amplifier, whose +ve input is taken to a reference voltage and whose −ve input is at a potential, which is lower when the when the door contact switch is closed and higher when the door contact switch is open, that its +ve input. With such a circuit, the +ve input of an operational amplifier can be connected to the output of a comparator, the −ve input of which sees a reference voltage and the +ve input of which is brought by the second time element to a potential lower than that of its −ve input at a specified time after the door contact switch is closed and to a potential higher than that of its −ve input by closing the ignition switch.

An example of the operation of the invention is described in the following with reference to the drawing which shows a schematic diagram for a preferred embodiment of the invention.

The interior light L of a motor vehicle is connected, on the one hand, to the positive pole of the vehicle battery and, on the other, can be connected by manual switch S either directly (position 1) or through relay contacts RK (position 2) to the negative pole, that is, to ground. In addition, switch S has an open position 0. The relay contacts RK are closed when current is flowing in the coil of relay R. This coil is connected, on the one hand, to the positive pole of the vehicle battery and, on the other, through a transistor T to ground. The base of transistor T is connected to the output of an operational amplifier OP whose inverting (−) input is connected through a resistance R1 to the positive pole and through a door contact switch TK, which is closed when the vehicle door is open, and two diodes D1 and D2 to ground. In addition, a capacitor C1 is arranged between the (−) input of the operational amplifier OP and ground. The noninverting (+) input of the operational amplifier is connected to a reference voltage node A, which is formed by resistances R3 and R4, R5.

Resistance R1 and capacitor C1 form a first timing element, which continues to maintain the excitation of relay R over a predetermined period of time after the door of the vehicle is closed, that is, after the previously closed door contact switch TK is opened. Through opening TK, the potential at the (−) input of the OP is increased continuously from the value of the sum of the forward voltages of D1 and D2, that is from 1.4 V, while the (−) input is at the potential of, for example 8 V. With this arrangement, the base of transistor T is positive before and after TK is closed, so that transistor T continues to drive light, when manual switch S is in position 2. If the voltage at the (−) input of OP gradually rises above the value of the potential of the (+) input due to the charging of capacitor C1 through resistance R1, the output of the operational amplifier OP and, with it, the base of transistor T are switched to ground, as a result of which transistor T turns off, relay R drops out, relay contacts RK are opened and light L goes out.

If the door is opened, door contact TK is closed and the (−) input of OP is grounded by diodes D1 and D2, as a result of which its potential becomes lower than the potential of the (+) input, so that its output and, with it, the base of transistor T go high, the transistor is activated turning light L on.

In order to prevent discharging of the vehicle battery through continuous burning of light L when the door of the vehicle remains open for a longer period of time, a second timing element R2, C2 is provided, which causes the circuit of relay R to be interrupted when a specified period of time has elapsed after the door is opened. For this purpose, the (+) input of the operational amplifier OP is connected with the output of the comparator K, the inverting (−) input of which is connected with a reference voltage node B, which is formed by resistances R5 and R4, R3, and the noninverting (+) input of which is connected to ground over resistance R2 of the second timing element, a diode D3 and the door contact switch TK, which is closed when the door is open. Capacitor C2 of the second timing element is connected between the (+) input of comparator K and ground. If the door is opened, that is, if the door contact TK is closed, the +ve input of comparator K initially is at a higher potential than the (−) input due to the fact that capacitor C2 has previously been charged over the low resistance R6 and the diode D4. This means that the output of the comparator is high. As capacitor C2 discharges through the high resistance R2, the potential of the (+) input of comparator K falls off continuously, until the value of the capacitor voltage of C2 has dropped below the potential of the (−) input, as a result of which the output of the comparator and, with it, the (+) input of the operational amplifier OP, which is decoupled over high resistance R10 from the reference voltage source at node A, are connected to ground. As a result, the potential of the (+) input of the operational amplifier OP, whose value is less than 0.7 V, is lower than the potential of the (−) input, which lies at about 1.4 V because of the voltage drop of the diodes D1, D2 in the forward direction. Consequently the output of the operational amplifier OP and, with it, the base of transistor T are connected to ground, transistor T turns off, relay R drops out, relay contacts RK are opened and light L goes out. The second timing element R2, C2 has a delay time of, for example, 4 minutes, while the delay time of the first time element R1, C1 is, for example, 30 seconds.

In order to prevent light L from being turned off when a vehicle door is open over a longer period of time with the ignition switched on, that is, with the engine running, the (+) input of comparator K can also be connected through ignition switch ZS through the low resistance R7 and the diode D5 directly to the positive pole. Through closing ZS, the discharging of capacitor C2 stops due to the high resistance R2, that is, the (+) input of comparator K remains at a higher potential than the (−) input, so that the connection between the output of comparator K and the (+) input of the operational amplifier OP remains high and the conducting state of transistor T is maintained.

With a switch ZS1, which is closed when the ignition is turned on, the (−) input of the operational amplifier OP can be connected through a low resistance R8 and a diode D6 to the positive pole of the vehicle battery. Thus, with the door closed and thus the door contacts TK open, light L goes out immediately when the ignition is turned on, since the potential of the (−) input then is higher than the potential of the (+) input and therefore the output of the operational amplifier OP and, with it, the base of transistor T are connected to ground. For vehicles with a central locking device, a switch ZV is arranged in parallel with switch ZS1. When the central locking device is activated, switch ZV is closed and connects the (−) input of the OP over a low resistance R9 and a diode D7 with the positive pole of the vehicle battery. This causes light L to go out immediately almost. It is possible to delay turning off the light after ZS1 or ZV is closed at will from fractions of a second to several seconds by selecting appropriate values for resistances R8 and R9.

Many modifications of the examples of the operation shown are of course possible without departing from the scope of the invention. It is, for example, well known to those skilled in the art that the same functions can be carried out with an integrated twin comparator component, a dual operational amplifier circuit or also with TTL Schmitt triggers or CMOS technology and that, instead of the RC element, other electronic components, for example, a flip-flop, can be used as time element. If the load is light, that is, if the interior lighting consists of few lights, it is possible to do without relay R and to connect the emitter of transistor T directly to contact 2 of the manual switch S.

What is claimed is:

1. Switching device used in the interior lighting of a motor vehicle provided with an ignition lock and a battery, with a timing element that is controlled by a door contact switch, which is opened when a door of the vehicle is closed, and that permits the interior lighting to be left switched on for a first specified time after the door is closed, characterized in that a second timing element (C2 R2) is provided, which is controlled by closing the door contact switch (TK) and which turns off the interior lighting (L) after a second specified time when the ignition switch (ZS) is open and the door contact switch (TK) remains closed wherein said second specified time is selected to prevent discharge of said battery to a level hindering ignition of the engine of said motor vehicle.

2. Switching device as defined in claim 1, wherein the second timing element (R2 C2) is de-activated by closing the ignition switch (ZS).

3. Switching device as defined in claims 1 or 2, in which the interior illumination is switched on by a transistor, the base of which is connected to the output of an operational amplifier, the positive input of which amplifier is connected to a first reference voltage and the negative input of which, with the door contact switch open and after said first specified time, is at a higher potential than said positive input, wherein the positive input is brought to a lower potential than the potential of the negative input by the second timing element (R2 C2) when said second specified time has elapsed and to a higher potential than the potential of the negative input by opening the door contact switch (TK) or by closing the ignition switch (ZS).

* * * * *